(12) United States Patent
Iurshina et al.

(10) Patent No.: US 12,061,871 B2
(45) Date of Patent: Aug. 13, 2024

(54) DEVICE FOR AN AUTOMATED GENERATION OF A KNOWLEDGE GRAPH

(71) Applicant: Robert Bosch GmbH, Stuttgart (DE)

(72) Inventors: Anastasiia Iurshina, Stuttgart (DE); Heike Adel-Vu, Stuttgart (DE); Jannik Stroetgen, Karlsruhe (DE); Lukas Lange, Pforzheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 382 days.

(21) Appl. No.: 17/217,541

(22) Filed: Mar. 30, 2021

(65) Prior Publication Data
US 2021/0326530 A1   Oct. 21, 2021

(30) Foreign Application Priority Data

Apr. 16, 2020 (DE) ........................ 202020102105.2

(51) Int. Cl.
| | | |
|---|---|---|
| *G06F 40/263* | (2020.01) | |
| *G06F 40/117* | (2020.01) | |
| *G06F 40/279* | (2020.01) | |
| *G06N 3/045* | (2023.01) | |
| *G06N 3/049* | (2023.01) | |
| *G06N 3/08* | (2023.01) | |

(52) U.S. Cl.
CPC .......... *G06F 40/263* (2020.01); *G06F 40/117* (2020.01); *G06F 40/279* (2020.01); *G06N 3/045* (2023.01); *G06N 3/049* (2013.01); *G06N 3/08* (2013.01)

(58) Field of Classification Search
CPC .... G06F 40/263; G06F 40/279; G06F 40/117; G06N 3/045; G06N 3/049; G06N 3/08
See application file for complete search history.

(56) References Cited

U.S. PATENT DOCUMENTS

| | | | |
|---|---|---|---|
| 2018/0232451 A1* | 8/2018 | Lev-Tov | G06F 16/248 |
| 2020/0012886 A1* | 1/2020 | Walters | G06F 16/93 |
| 2020/0410053 A1* | 12/2020 | Zhang | G06N 3/02 |
| 2021/0089724 A1* | 3/2021 | Luong | G06N 5/04 |
| 2021/0157991 A1* | 5/2021 | Wang | G06N 3/047 |
| 2021/0233510 A1* | 7/2021 | Datta | G10L 15/005 |

OTHER PUBLICATIONS

Yaroslav Ganin et al "Domain-Adversarial Training of Neural Networks." Journal of Machine Learning Research 17. May 26, 2016. arXiv preprint arXiv: 1505.07818v1. Retrieved from the Internet on Mar. 30, 2021: https://arxiv.org/abs/1505.07818. 35 Pages.

\* cited by examiner

*Primary Examiner* — Bhavesh M Mehta
*Assistant Examiner* — Edward Tracy, Jr.
(74) *Attorney, Agent, or Firm* — NORTON ROSE FULBRIGHT US LLP; Gerard A. Messina

(57) ABSTRACT

A device for the automatic analysis of multilingual text, including an embedder, which is configured for assigning a numeric representation to each of the text components from the multilingual text, and a temporal tagger, which is configured for identifying and tagging temporal expressions in the multilingual text depending on the assigned numeric representations. The embedder is configured for assigning the numeric representations of temporal expressions in such a way that it is not possible to ascertain, on the basis of the numeric representation, in which language the associated text component is written.

19 Claims, 2 Drawing Sheets

DEVICE FOR AN AUTOMATED GENERATION OF A KNOWLEDGE GRAPH

CROSS REFERENCE

The present application claims the benefit under 35 U.S.C. § 119 of German Patent Application No. DE 202020102105.2 filed on Apr. 16, 2020, which is expressly incorporated herein by reference in its entirety.

FIELD

The present invention relates to a device for the automatic analysis of multilingual text, a training system for training the device, a device for an automated generation of a knowledge graph, and a machine-readable memory medium.

BACKGROUND INFORMATION

An ontology, which is also referred to as a knowledge graph, is a structured representation of entities and relationships between these entities. Ontologies are utilized for exchanging knowledge, in a formal manner, between computer-implemented application programs.

During the extraction of information from texts for filling knowledge graphs, the identification of time expressions also plays an important role: For example, many relationships between entities are valid only for a limited time (for example, the place of residence or the employer of persons). So-called "temporal tagging" deals with the automatic identification of time expressions in texts. Previous works in this regard utilize monolingual models, i.e., language-specific models, which may be applied only to texts in a certain language, but not to texts in other languages.

A method is described in "Domain-Adversarial Training of Neural Networks," arXiv preprint arXiv: 1505.07818v1, by Yaroslav Ganin et al., 2015, for training a neural network on labeled data from a source domain and unlabeled data from a target domain (i.e., no labeled data from the target domain are necessary). As the training progresses, the approach promotes the emergence of features that are (i) discriminatory for the main learning task in the source domain and (ii) indiscriminate with respect to the shift between the domains. The method described herein is also known as gradient reversal training.

SUMMARY

An example embodiment of the present invention may be applied to texts in a plurality of languages. In addition, a transfer power across languages is possible.

Advantageous refinements and further aspects of the present invention are described herein.

When a model learns, for example, from English texts that "today" is a time expression, but the word "heute" never occurs in German training texts, a monolingual model cannot interpret the term "heute" as a concept of time. A multilingual model may know from another source (for example, due to multilingual embeddings), however, that "today" and "heute" have a similar meaning and, as a result, may also correctly identify the word "heute" as a time expression.

In accordance with an example embodiment of the present invention, one solution to this problem may therefore be broken down into two substeps:
  1. training and applying a multilingual model on the data of multiple languages
  2. aligning numeric representations, known as embeddings, so that semantic similarities across languages may be identified.

In a first aspect, the present invention therefore relates to a device for the automatic analysis of multilingual text in languages from a predefinable plurality of languages. In accordance with an example embodiment of the present invention, the device includes an embedder, which is configured for assigning the numeric representation (i.e., the embedding) to each of the text components (for example, words or parts of words) from the multilingual text, and a temporal tagger, which is configured for identifying and tagging temporal expressions in the multilingual text depending on the assigned embeddings, the embedder being configured for preferably assigning the numeric representations of temporal expressions in such a way that it is not possible to ascertain, on the basis of the numeric representation, in which language the associated text component is written.

It is possible to solve the two aforementioned problems with the aid of a single neural model, which is trained on the data of different languages and, due to adversarial training (in particular, gradient reversal training), generates a multilingual vector space for the word embeddings, in which a discriminator (second neural network) is unable to differentiate the language from which a certain word originates.

The present invention may be utilized for the automatic extraction of temporal expressions from texts. This is an important subaspect of filling knowledge graphs, since many facts are valid only for a certain time. This validity period must be tagged in the knowledge graph, in order not to generate errors during the application of the graph.

In fact, the methods described in Ganin et al. (2015) may be applied, generally, to all expressions occurring in a sentence. Actually, it is provided in one advantageous specific embodiment to not extract the temporal expressions first and then carry out a language identification with gradient reversal, but rather to apply both in parallel, i.e., the language identification with gradient reversal is applied to all expressions, regardless of whether they are temporal expressions, or not. It was now found that the identification of temporal expressions with the aid of this method is advantageous, because temporal expressions have a similar structure across a plurality of languages.

If, instead, one would want to extract, for example, grammatical structures such as accusative objects, or the like, then such a transfer across languages would not be as effective, because an accusative object in one language may have an entirely different grammatical function in another language.

The present invention therefore makes it possible to utilize multilingual models for temporal tagging (instead of monolingual models). This is more advantageous than utilizing rule-based models, since this does not transfer well to new languages.

In experiments, it has been shown that a transfer to unknown languages functions a great deal better with the aid of the model in accordance with an example embodiment of the present invention than with the aid of comparison models from the related art.

One further advantage of one further aspect of the present invention is the utilization of gradient reversal, in order to improve multilingual embedding space (such a method is known from the related art only at higher network layers, and the multilingual embeddings in the input are, there, only a means to an end, but not the focus of the improvement).

This aspect of the present invention may be utilized for the automatic extraction of temporal expressions from texts. This is an important subaspect of filling knowledge graphs, since many facts, i.e., entities and/or relationships, are valid only for a certain time. This validity period may be tagged in the knowledge graph, in order not to generate errors during the application of the knowledge graph.

An (in particular neural) multilingual model is therefore provided, which may automatically extract temporal expressions from texts of different languages, so that these may be inserted into a knowledge graph as additional information in addition to facts.

Moreover, it is provided to train the model with the aid of adversarial training (in particular, gradient reversal training), in order to generate a multilingual word embedding space, in which it is not possible to differentiate languages from one another.

In the adversarial training, it may be provided that a target function for training the temporal tagger alternates with a target function for training the discriminator and ensures, for example, due to gradient reversal, that the embedding vector space is updated in such a way that the discriminator is preferably unable to differentiate the languages from one another. Namely, it was found that this results in semantically similar temporal expressions from different languages receiving similar embeddings.

As the result, the model may be applied to texts of an arbitrary language, without the need to explicitly indicate which language it is. It is also possible to apply the model to languages that do not come from the group of languages on which it was trained. The only precondition is that this language is present in the multilingual embeddings. Herein lies the transfer power of the model with respect to monolingual or rule-based systems.

That means, in a training phase, training data including tagged temporal expressions from different languages may be utilized from the outset. The embedder, in particular a neural model (for example, a state of the art BERT model), is trained on or adapted (in the case of BERT) to these training data. The latter may take place by fine-tuning: BERT is typically pre-trained on a language model task and may be adapted, by fine-tuning, to the target task.

For this purpose, multilingual embeddings may be utilized, i.e., there is a single vector space for the embeddings from all languages. Specifically, the following steps may be carried out:

Initially, the training data may be divided into batches, it being ensured that each batch contains examples from multiple, in particular all, languages.

With the aid of the training batches, the neural model is trained with the aid of adversarial training. In the process,
a) on the one hand, an output of the temporal tagger is trained in such a way that it identifies preferably all temporal expressions in the training data
b) on the other hand, the discriminator is trained in such a way that, given the multilingual embeddings of the batch, it attempts to determine the language of the training example. Due to gradient reversal training, in this way, an embedding vector space is generated, in which it is not possible (or very difficult) for the discriminator to differentiate individual languages from one another.

In order to apply this model, a provided multilingual text, i.e., a single text or a plurality of texts from different languages, may be utilized at the outset.

The trained temporal tagger may now be applied on these texts. The temporal tagger does not need to have information regarding the language from which the text originates, since the embedding space is multilingual and the temporal tagger was trained to identify the time expressions regardless of the language.

These identified temporal expressions may then be utilized, in a known way, for automatically building or filling a knowledge graph.

Specific embodiments of the present invention are explained in greater detail below with reference to the figures.

DETAILED DESCRIPTION OF EXAMPLE EMBODIMENTS

Figure 1:
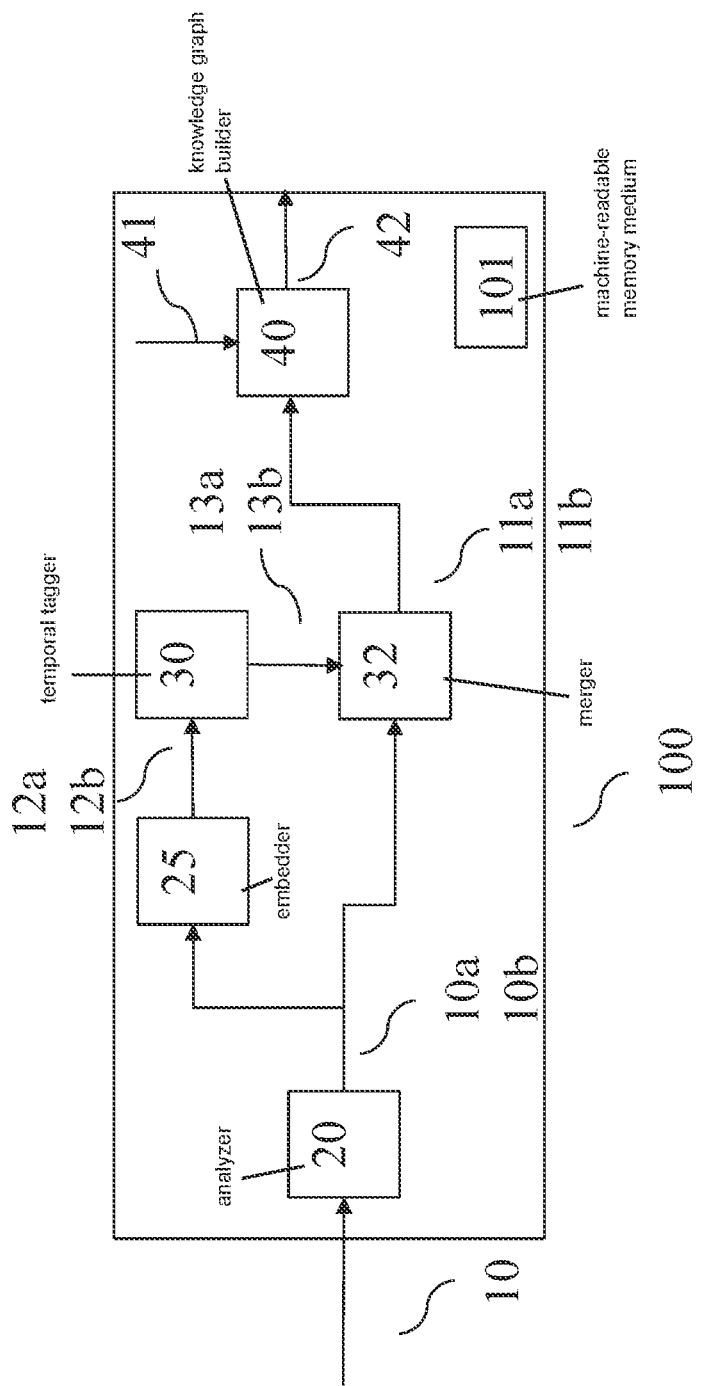
FIG. 1 schematically shows the configuration of one exemplary embodiment of the device for analyzing multilingual text, in accordance with the present invention.

FIG. 1 schematically shows a configuration of the device 100 for analyzing multilingual text 10. Text 10, which may include one or multiple document(s) and may be written in a plurality of languages, is initially supplied to an analyzer 20, which extracts text components 10a, 10b from the text 10.

Alternatively, it is also possible that the text components 10a, 10b are supplied directly to the device 100 for analyzing multilingual text 10. These text components are supplied to the embedder 25, which, in the exemplary embodiment, is given by an artificial neural network, for example, a BERT model, which ascertains an associated numeric representation 12a, 12b for each text component 10a, 10b.

These numeric representations 12a, 12b are supplied to the temporal tagger 30, which is also given by a neural network and ascertains a flag 13a, 13b for each of the numeric representations 12a, 12b, which indicates whether the text component 10a, 10b associated with the particular numeric representation 12a, 12b is a temporal expression, or not.

The flags 13a, 13b are supplied, together with the text components 10a, 10b, to a merger 32, which merges flags 13a, 13b with the particular associated text component 10a, 10b, in order to ascertain, therefrom, temporally tagged text components 11a, 11b.

These may be supplied to an optional knowledge graph builder 40, to which an existing knowledge graph 41 is provided, and which identifies entities and relationships between these entities in the temporally tagged text components 11a, 11b, assigns these identified temporal expressions to the entities and/or to the relationships and takes these into account as a characterization of the particular assigned entities and/or relationships during the generation of the knowledge graph.

The device 100 for the analysis of multilingual text 10 may be, for example, a computer system, the aforementioned components 20, 25, 30, 32, 40 being implemented as computer programs, which are stored on a machine-readable memory medium 101.

Figure 2:
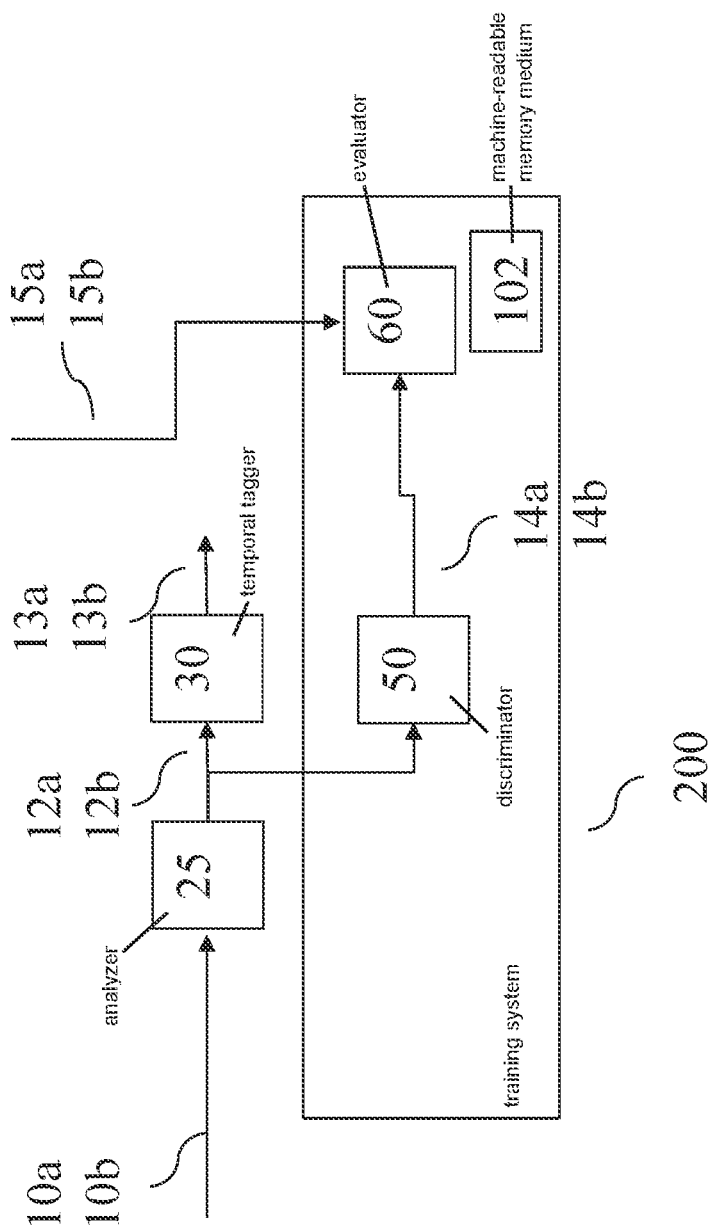
FIG. 2 schematically shows the configuration of one exemplary embodiment of a training system in accordance with the present invention.

FIG. 2 schematically shows the configuration of the training system 200 for training the device 100 for the analysis of multilingual text 10. Text components 10a, 10b are supplied, as shown in FIG. 1, to the embedder 25, which ascertains, therefrom, numeric representations 12a, 12b, from which temporal flags 13a, 13b may be ascertained, as described with reference to FIG. 1, with the aid of the temporal tagger 30. The numeric representations 12a, 12b are supplied to the discriminator 50, which attempts to ascertain, from the numeric representations 12a, 12b, to which language the associated text component 10a, 10b belongs. The discriminator 50 is provided, in the exemplary embodiment, by an artificial neural network.

These particular estimated languages, encoded in estimated language flags 14a, 14b, are transferred to an evaluator 60, as is also the case for actual language flags 15a, 15b, which indicate, as ground truth, what the actual language of the language components 10a, 10b is. The evaluator 60 now ascertains, with the aid of a cost function, how well estimated language flags 14a, 14b and actual language flags 15a, 15b match and changes parameters of the discriminator 50 in such a way that the match is as good as possible and changes parameters of the embedder 25 in such a way that the match is as poor as possible. Mathematically, this is achieved in that, during the backpropagation of the gradient, the sign of the gradient of the parameters of the embedder 25 and of the gradient of the parameters of the discriminator 50 have opposite signs.

The temporal tagger 30 may be trained as part of the training system 200 or also outside the training system 200. Preferably, the training data are divided into batches, it being ensured that each batch contains examples from all languages. With the aid of these training data, the temporal tagger 30 is trained, so that it identifies preferably all time expressions in the training data and trains the embedder 25 and the discriminator 50 with the aid of the same training data.

The training system 200 may be, for example, a computer system, the aforementioned components 50, 60 being implemented as computer programs, which are stored on a machine-readable memory medium 102.

It is understood that the methods may be completely implemented in software not only as described. They may also be implemented in hardware, or in a mixed form made up of software and hardware.

What is claimed is:

1. A training system for training a device for automatic analysis of multilingual text, the training system comprising:
   the device for automatic analysis of multilingual text, including:
      an embedder including a machine learning system configured to assign a numeric representation to each text component of text components from the multilingual text, and
      a temporal tagger configured to identify and tag temporal expressions in the multilingual text depending on the assigned numeric representations;
   a discriminator configured to receive the numeric representations from the embedder of the device, and attempt to ascertain, based on the numeric representations, in which language the temporal expressions are written, wherein the discriminator outputs flags representing the ascertained languages of the temporal expressions;
   an evaluator to receive the flags from the discriminator and flags representing the actual languages of the temporal expressions, and change parameters of the machine learning system of the embedder so that the embedder is configured to assign the numeric representations of the temporal expressions in such a way that the discriminator is unable to decide, depending on the numeric representation, to which language the temporal expression belongs;
   wherein the training system is configured to adversarially train the discriminator and the embedder together.

2. The training system as recited in claim 1, wherein the embedder is configured to map all temporal expressions of all languages of the device into a single vector space.

3. The training system as recited in claim 1, wherein the machine-learning system includes a neural network.

4. The training system as recited in claim 3, wherein the neural network is a BERT model.

5. The training system as recited in claim 1, wherein the discriminator includes a second machine-learning system.

6. The training system as recited in claim 5, wherein the second machine-learning system includes a second neural network.

7. The training system as recited in claim 5, wherein the discriminator was trained, depending on the numeric representation of the temporal expression, to be able to decide to which language the temporal expression belongs.

8. The training system as recited in claim 6, wherein the temporal tagger includes a third machine-learning system.

9. The training system as recited in claim 8, wherein the third machine-learning system includes a third neural network.

10. The training system as recited in claim 8, wherein the temporal tagger was trained, depending on the numeric representation, to be able to decide whether the associated text component is a temporal expression or not.

11. The training system as recited in claim 8, wherein the temporal tagger was trained, depending on the numeric representation, to be able to decide whether the associated text component is a temporal expression or not, and wherein the discriminator and the embedder and the temporal tagger were adversarially trained together.

12. The training system as recited in claim 1, wherein the training system is configured to train the discriminator and the embedder using gradient reversal training.

13. The training system as recited in claim 1, wherein the training system is configured to divide training data utilized during the training of the discriminator and the embedder into batches in such a way that each batch of the batches contains training examples made up of a particular selected plurality of a predefinable plurality of languages.

14. The training system as recited in claim 13, wherein the training system is configured to divide the training data utilized during the training of the discriminator and the embedder into batches in such a way that each batch contains training examples from each language of the predefinable plurality of languages.

15. The training system as recited in claim 1, wherein the training system is configured to ascertain, with the aid of the temporal tagger, whether an associated text component is a temporal expression or not, and for carrying out the training of the discriminator and/or the embedder with respect to the expressions for which it was ascertained that the associated text components is a temporal expression.

16. The training system as recited in claim 1, wherein the training system is configured to also train the temporal tagger, depending on the numeric representation, toward a training objective of being able to decide whether a text component associated with the numeric representation is a temporal expression or not.

17. The training system as recited in claim 16, wherein the training system is configured to train the temporal tagger, the embedder, and the discriminator on the same training examples.

18. A method for training a device for automatic analysis of multilingual text, comprising:
- receiving, by a discriminator, numeric representations from an embedder including a machine learning system configured to assign a numeric representation to each text component of text components from the multilingual text;
- attempting to ascertain, by the discriminator, based on the numeric representations, in which language the temporal expressions are written, wherein the discriminator outputs flags representing the ascertained languages of the temporal expressions;
- receiving, by an evaluator, the flags from the discriminator and flags representing the actual languages of the temporal expressions,
- changing parameters of the machine learning system of the embedder so that the embedder is configured to assign the numeric representations of the temporal expressions in such a way that the discriminator is unable to decide, depending on the numeric representation, to which language the temporal expression belongs; and
- adversarially training the discriminator and the embedder together.

19. A non-transitory machine readable storage medium having program instructions, which when executed by a processor control a method for training a device for automatic analysis of multilingual text, the method comprising:
- receiving, by a discriminator, numeric representations from an embedder including a machine learning system configured to assign a numeric representation to each text component of text components from the multilingual text;
- attempting to ascertain, by the discriminator, based on the numeric representations, in which language the temporal expressions are written, wherein the discriminator outputs flags representing the ascertained languages of the temporal expressions;
- receiving, by an evaluator, the flags from the discriminator and flags representing the actual languages of the temporal expressions,
- changing parameters of the machine learning system of the embedder so that the embedder is configured to assign the numeric representations of the temporal expressions in such a way that the discriminator is unable to decide, depending on the numeric representation, to which language the temporal expression belongs; and
- adversarially training the discriminator and the embedder together.

* * * * *